(12) United States Patent
Patel et al.

(10) Patent No.: US 9,088,876 B2
(45) Date of Patent: Jul. 21, 2015

(54) WIFI INTERWORKING SOLUTIONS FOR PUSH-TO-TALK-OVER-CELLULAR (POC)

(71) Applicant: Kodiak Networks, Inc., San Ramon, CA (US)

(72) Inventors: Krishnakant M. Patel, Richardson, TX (US); Harisha M. Negalaguli, Richardson, TX (US); Brahmananda R. Vempati, Dallas, TX (US); Shiva K. K. Cheedella, Plano, TX (US); Arun Velayudhan, Karnataka (IN); Raajeev Kuppa, Plano, TX (US); Gorachand Kundu, Kamataka (IN); Ravi Ganesh Ramamoorthy, Karnataka (IN); Ramu Kandula, Bangalore (IN); Ravi Ayyasamy, Richardson, TX (US); Ravi Shankar Kumar, Plano, TX (US)

(73) Assignee: KODIAK NETWORKS, INC., San Ramon, CA (US)

( * ) Notice: Subject to any disclaimer, the term of this patent is extended or adjusted under 35 U.S.C. 154(b) by 289 days.

(21) Appl. No.: 13/757,520

(22) Filed: Feb. 1, 2013

(65) Prior Publication Data

US 2013/0196706 A1  Aug. 1, 2013

Related U.S. Application Data

(60) Provisional application No. 61/593,485, filed on Feb. 1, 2012.

(51) Int. Cl.
*H04B 7/24* (2006.01)
*H04W 76/00* (2009.01)
*H04W 4/10* (2009.01)

(52) U.S. Cl.
CPC ........................ *H04W 4/10* (2013.01)

(58) Field of Classification Search
CPC ............................ H04W 76/005; H04W 4/10
USPC .............. 455/518, 517, 519, 520, 509, 452.1, 455/452.2, 412.1, 418, 420; 370/328, 331, 370/332, 325
See application file for complete search history.

(56) References Cited

U.S. PATENT DOCUMENTS

| | | | |
|---|---|---|---|
| 3,912,874 | A | 10/1975 | Botterell et al. |
| 4,796,293 | A | 1/1989 | Blinken et al. |
| 5,353,328 | A | 10/1994 | Jokimies |
| 5,442,809 | A | 8/1995 | Diaz et al. |

(Continued)

FOREIGN PATENT DOCUMENTS

| | | |
|---|---|---|
| GB | 2338150 | 12/1999 |
| JP | 2003-92776 | 3/2003 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner* — John J Lee
(74) *Attorney, Agent, or Firm* — Gates & Cooper LLP

(57) ABSTRACT

WiFi interworking solutions for Push-To-Talk over Cellular (PoC) in the Open Mobile Alliance (OMA) Standard.

16 Claims, 7 Drawing Sheets

(56) References Cited

U.S. PATENT DOCUMENTS

| | | |
|---|---|---|
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 5/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskyj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0021400 A1 | 1/2003 | Grandgent et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Westman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswaas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | LaDue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0325540 A1 | 12/2009 | Yach et al. |
| 2010/0035593 A1 | 2/2010 | Franco et al. |
| 2010/0142414 A1 | 6/2010 | Patel et al. |

(56) References Cited

U.S. PATENT DOCUMENTS

| | | |
|---|---|---|
| 2010/0190492 A1 | 7/2010 | Jiang |
| 2010/0234018 A1 | 9/2010 | Lawler et al. |
| 2011/0116419 A1* | 5/2011 | Cholas et al. ............ 370/259 |
| 2011/0151917 A1 | 6/2011 | Mao et al. |
| 2011/0183659 A1 | 7/2011 | Ayyasamy et al. |
| 2011/0250869 A1* | 10/2011 | Mahajan ............ 455/412.1 |
| 2011/0250923 A1 | 10/2011 | Miller et al. |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0148210 A1 | 5/2014 | Kundu et al. |

FOREIGN PATENT DOCUMENTS

| | | |
|---|---|---|
| WO | 00/69189 | 11/2000 |
| WO | 00/79825 | 12/2000 |
| WO | 01/67674 | 9/2001 |
| WO | 02/101981 | 12/2002 |
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |
| WO | 2010/048217 | 4/2010 |
| WO | 2010/117815 | 10/2010 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", trackwell.com, Oct. 2002, pp. 1-1. XP002345781 http://www.trackwell.com/news/news_twandtetra.htm.

* cited by examiner

WIFI INTERWORKING SOLUTIONS FOR PUSH-TO-TALK-OVER-CELLULAR (POC)

CROSS REFERENCE TO RELATED APPLICATIONS

This application claims the benefit under 35 U.S.C. Section 119(e) of the following co-pending and commonly-assigned patent application:

U.S. Provisional Application Ser. No. 61/593,485, filed Feb. 1, 2012, by Krishnakant M. Patel, Harisha Mahabaleshwara Negalaguli, Brahmananda R. Vempati, Shiva Koteshwara Kiran Cheedella, Arun Velayudhan, Raajeev Kuppa, and Gorachand Kundu, entitled "WiFi INTERWORKING SOLUTIONS FOR PUSH-TO-TALK OVER CELLULAR (PoC) IN THE OPEN MOBILE ALLIANCE (OMA) STANDARD";

which application is incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896;

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (POC) CALL SETUP OPTIMIZATIONS," which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (POC) CALL SETUP OPTIMIZATIONS,";

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negaluguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694, filed Dec. 14, 2011, by Ravi Ayyasamy, Gorachand Kundu, Krishnakant M. Patel, Brahmananda R. Vempati, Harisha Mahabaleshwara Negalaguli, Shiva Koteshwara Kiran Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),"; all of which applications are incorporated by reference herein.

BACKGROUND OF THE INVENTION

1. Field of the Invention

This invention relates in general to Push-To-Talk over Cellular (PoC), and more specifically, to WiFi interworking solutions for PoC in the Open Mobile Alliance (OMA) Standard.

2. Description of Related Art

Advanced voice services (AVS), also known as Advanced Group Services (AGS), such as two-way half-duplex voice calls within a group, also known as Push-to-Talk-over-Cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks and personal communications systems (PCS) networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

Nonetheless, there is a need in the art for improvements to the methods and systems for delivering the advanced voice services, such as PoC, that comply with both existing and emerging wireless packet-based standards and yet provide superior user experiences. Many existing implementations of PoC suffer from an inferior user experience. The present invention satisfies the need for a superior user experience, and also defines procedures for practical implementation of PoC in commercial, standards-based, cellular networks, with a focus on features such as WiFi interworking solutions.

SUMMARY OF THE INVENTION

To overcome the limitations in the prior art described above, and to overcome other limitations that will become apparent upon reading and understanding the present specification, the present invention discloses a Push-to-Talk-over-Cellular (PoC) implementation for use in wireless communications networks, such as cellular mobile phone networks, wireless data networks and WiFi networks, wherein one or more servers interface to the wireless communications networks to perform PoC call sessions. Both the servers and the mobile units that use the PoC call sessions communicate with each other using SIP/IP (Session Initiation Protocol/Internet Protocol) control messages within the wireless communications networks, and one or more of the servers switches RTP/IP (Realtime Transport Protocol/Internet Protocol) voice packets, RTCP/IP (Realtime Transport Control Protocol/Internet Protocol), or MBCP/IP (Media Burst Control Protocol/Internet Protocol) controlling/signaling packets for the PoC call sessions between the mobile units across the wireless communications networks.

BRIEF DESCRIPTION OF THE DRAWINGS

Referring now to the drawings in which like reference numbers represent corresponding parts throughout.

DETAILED DESCRIPTION OF THE INVENTION

Figure 1:
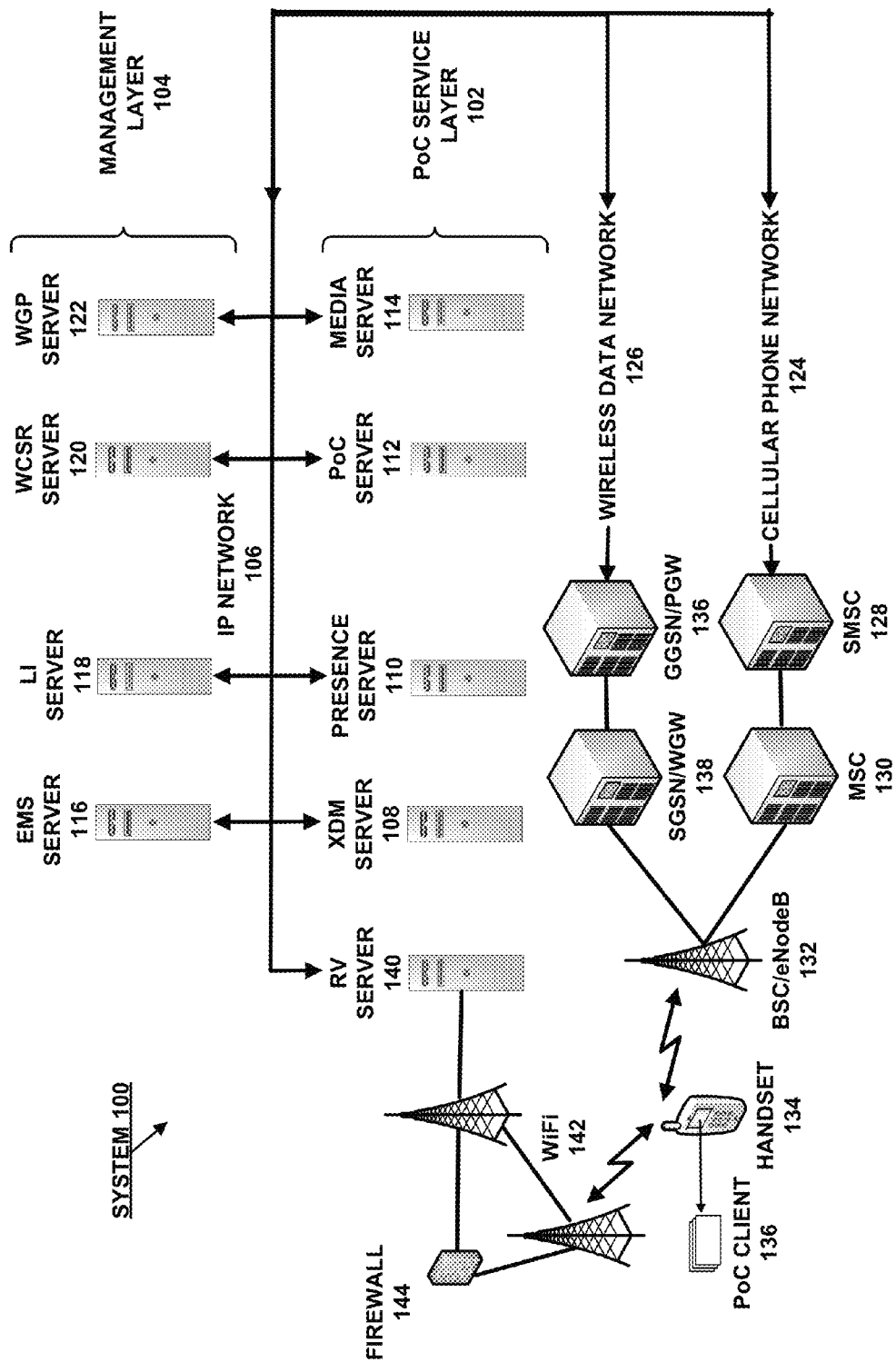
FIG. 1 is a block diagram that illustrates an exemplary embodiment of a wireless communications network according to a preferred embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing Push-to-Talk-over-Cellular (PoC) that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure.

This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SIM | Subscriber Identity Module |
| SIP | Session Initiation Protocol |
| SMMP | Short message peer-to-peer protocol |
| SMS | Small message service |
| URI | Uniform Resource Identifier |
| VoIP | Voice-over-IP |
| WGW | Wireless GateWay |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1 – 1 PoC Session | A feature enabling a PoC User to establish a PoC Session with another PoC User. |
| 1 + 1 Redundancy | A configuration where the each primary server has a dedicated secondary server configured in the same chassis. The primary server is configured as active and the secondary server is configured as standby. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Geo Redundancy | A configuration where each serving server has a geographically separated standby server. This standby server takes over the active role only when the serving server fails. |
| Home PoC Server | The PoC Server of the PoC Service Provider that provides PoC service to the PoC User. |
| Instant Personal Alert | A feature in which a PoC User sends a SIP based instant message to a PoC User requesting a 1 – 1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signalling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |

| Term | Description |
|---|---|
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the PoC solution of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 (also referred to as a mobile unit, mobile station, mobile phone, cellular phone, etc.) executing a PoC Client 136. The wireless data network 126, depending on its type, e.g., GPRS or 4G/LTE, includes one or more Gateway GPRS Support Nodes (GGSNs) or Packet Gateways (PGWs) 136 and Serving GPRS Support Nodes (SGSNs) or Wireless GateWays (WGWs) 138, which also communicate with customer handsets 134 via BSCs or eNodeBs 132.

Finally, in one embodiment of the present invention, the PoC Service Layer 102 and Management Layer 104 are connected to one or more RendeVous (RV) Servers 140, which are coupled to one or more WiFi networks 142, in order to communicate with one or more PoC Clients 136 on one or more handsets 134. Note that the WiFi networks 142 are IP networks, which may be implemented in a single network or as separate networks, and may include one or more Firewalls 144.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 136 transfers IP packets between the PoC Client 136 and the various servers:
    SIP/IP signaling messages between the PoC Server 112 and PoC Client 136 for control traffic exchange (i.e., control packets) for PoC call sessions.
    RTP/IP, RTCP/IP and MBCP/IP packets between the Media Server 114 and PoC Client 136 for bearer traffic exchange (i.e., voice packets) for PoC call sessions.
    SIP/IP signaling messages between the Presence Server 110 and PoC Client 136 for presence information.
    XCAP/HTTP/IP and SIP/IP signaling between the XDM Server 108 and PoC Client 136 for document management.

The SMSC 128 handles authentication:
    The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the WiFi network 142:

The RV Server 140 transfers IP packets between the PoC Client 136 and the various servers:
    SIP/IP signaling messages between the PoC Server 112 and PoC Client 136 for control traffic exchange (i.e., control packets) for PoC call sessions.
    RTP/IP, RTCP/IP and MBCP/IP packets between the Media Server 114 and PoC Client 136 for bearer traffic exchange (i.e., voice packets) for PoC call sessions.
    SIP/IP signaling messages between the Presence Server 110 and PoC Client 136 for presence information.
    XCAP/HTTP/IP and SIP/IP signaling between the XDM Server 108 and PoC Client 136 for document management.
    SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
PoC Server 112,
Media Server 114,
Presence Server 110,
XDM Server 108, and
RV Server 140.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 RV Server

The RV Server 140 implements a WiFi interworking solution for the PoC Service to communicate via one or more WiFi network 142 access points to the PoC Clients 136. Specifically, the RV Server 140 provides PoC Service over a WiFi network 142 (or similar Internet environments), and supports a seamless user experience while the transport of IP control messages and IP voice data is transitioned between different types of wireless communications networks, such as wireless data networks 126 comprising cellular data packet networks and WiFi networks 142. The RV Server 140 also resolves security concerns that arise with such WiFi interworking solutions.

This is necessary because the quality, performance and availability of the wireless data networks 126 typically vary from location to location based on various factors. In addressing these issues, the WiFi interworking solution implemented by the RV Server 140 provides following benefits:

- PoC Services becomes available even in those locations where a wireless data network 126 is not available, but where a general purpose WiFi network 142 is available. This is particularly more useful in enhancing in-building coverage for the PoC Service.
- By connecting over the WiFi network 142, the available IP bandwidth, quality and performance can be more streamlined and controlled since the WiFi network 142 (typically) has a greater capacity and throughput as compared to the wireless data network 126, which is more shared in nature.
- By utilizing the greater available bandwidth over the WiFi network 142, as compared to the wireless data network 126, it is possible to provide additional services (such as sharing large files) which otherwise is inefficient and costly on wireless data networks 126.

These and other aspects of the WiFi interworking solution are described in more detail below.

2.5 Management Layer Elements

As noted above, the Management Layer 104 is comprised of the following elements:

Element Management System (EMS) Server 116,
Lawful Intercept (LI) Server 118,
Web Group Provisioning (WGP) Server 122, and
Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer

3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.4 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains a separate subscription for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.5 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.6 RV Server

The RV Server 140 performs WiFi interworking for the PoC service by communicating with the PoC Clients 136 via one or more WiFi networks 142.

The PoC Client 136 sets up one or more connections using the configured Fully Qualified Domain Name (FQDN), or absolute domain name, of the RV Server 140, which may be publicly exposed to the Internet. Secure transport protocols may (or may not) be used for the connections across the WiFi networks 142. For example, the PoC Clients 136 may use the Transport Layer Security (TLS) and/or Secure Sockets Layer (SSL) protocols for encrypting information transmitted over the connections between the PoC Client 136 and the RV Server 140.

In such an embodiment, all SIP signaling and voice data (RTP and RTCP) would be tunneled over the SSL/TLS connections between the PoC Client 136 and the RV Server 140. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the RV Server 140 performs as an encryption/decryption off-loader that provides end-to-end encryption for all traffic transmitted to and from the PoC Client 136. Specifically, all of the traffic sent to the PoC Client 136 is encrypted at the RV Server 140 and all the traffic received from the PoC Client 136 is decrypted at the RV Server 140.

The RV Server 140 terminates the SSL/TLS connections and aggregates or dis-aggregates the PoC Client 136 traffic to the appropriate Servers 108, 110, 112, 114, 116, 118, 120 and 122. Specifically, the RV Server 140 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the RV Server 140 is a single point-of-contact for all traffic to and from the PoC Clients 136 at an IP transport layer via the WiFi networks 142.

Typically, the SSL/TLS connections are persisted and used for any bidirectional data transfer between the RV Server 140, or other Servers, and the PoC Clients 136. Thus, a PoC Client 136 maintains an "always-on" connection with the RV Server 140 by periodically sending "keep-alive" messages over the SSL/TLS connections.

The present invention also simplifies the traversal of the Firewalls 144. Preferably, the PoC Clients 136 establish the SSL/TLS connections to the RV Server 140 over TCP port 443, which is typically used for HTTPS communications.

This allows for Firewall 144 traversal on most corporate networks, because the Firewall 144 facing (exposed to) the Internet is default configured to allow (and not deny) the SSL/TLS connections on TCP port 443. As a result, the present invention does not require that any special changes be made to the Firewall 144, such as those changes typically required for VoIP deployments in corporate networks. Instead, the traffic with the PoC Clients 136 is routed over SSL/TLS connections on TCP port 443, which can traverse through the Firewalls 144 seamlessly.

3.2 Management Layer 3.2.1 EMS Server

The EMS Server 116 is the central management entity in the system and includes the following modules:

- A central application where all management business logic resides.
- A web server for serving the network operator's internal users. A corresponding client provides a user interface for viewing fault, configuration, performance and security information.
- A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

- Create Subscriber account,
- Update Subscriber account,
- Delete Subscriber account,
- Mobile number change command,
- Forced synchronization of a Subscriber,
- Deactivate a Subscriber account,
- Reactivate a Subscriber account,
- View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

- group management,
- contact management, and
- associations between corporations.

With regard to group management, the CAT of the WGP Server 122 includes the following operations:

- Create, Update, Delete and View Corporate Groups,
- Add, Update, Delete and View Members of a Corporate Group,
- Manage Subscribers,
- Activate and Deactivate a Corporate Subscriber,
- Change a Subscriber type from "Corporate" to "Corporate And Public", and vice versa,
- Restrict Availability, i.e., do not allow subscriber to change their presence status, and
- Manage number porting or name change via phone assignment.

With regard to contact management, the CAT of the WGP Server 122 includes the following operations:

- Phone list management,
- N×N Contact Add (e.g., N contacts may be members of N groups),
- Add, Update, Delete and View Contacts for a specific subscriber, and
- Export and Import contacts at both the subscriber and corporate level.

With regard to associations between corporations, the CAT of the WGP Server 122 includes the following operations:

- Corporate Associations Attributes,
- Association Name,
- Association ID,
- Association Mode (e.g., One-way, Two-way), and
- Restricted List.

Once the association is created and accepted, corporate administrators can create contacts and groups using the association policies. Administrators from other corporations can view the contacts, and may or may not have the capability to add, update or delete the contacts.

- Corporate ID associated per corporate subscriber,
- Central management of corporate subscribers, groups, and contacts,
- Intercorporate associations, including contacts and white lists,
- Phone list management (e.g., N×N contact add),
- Restrict Availability, and
- Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:

- PoC Calls and Instant Personal Alert,
- Presence, and
- Contact and Group Management.

The PoC Client 136 includes a database module, a presence module, an XDMC module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDMC module communicates with the XDM Server 108 for management of contacts and groups. The XDMC module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

3.4 WiFi Interworking Solutions

Smart phones these days seamlessly transition between WiFi networks 142 and wireless data networks 126 to provide data connectivity. However, most PoC Clients 136 lose access to the Servers 108, 110, 112, 114, 116, 118, 120 and 122 when there is a handover or transition between a wireless data network 126 and a WiFi networks 142. As a result, PoC Service may be lost, when a handset 134 attempts to connect via a WiFi network 142 instead of a wireless data network 126, and PoC call sessions may be interrupted. The present invention provides a WiFi interworking solution, which results in seamless transitions for a handset 134 and PoC Client 136 between a wireless data network 126 and a WiFi network 142.

In the present invention, the PoC Client 136 handles the transitions between a wireless data network 126 and a WiFi network 142 by recognizing the type of network connectivity being used by the handset 134, and intelligently adapting, for the chosen network 126 or 144, the proper mechanisms for communication with the Servers 108, 110, 112, 114, 116, 118, 120, 122, 140 and 146.

In one embodiment, when an idle handover occurs between the wireless data network 126 and a WiFi network 142 (i.e., no PoC call session is in progress), the transition will be transparent to the user. Specifically, no indication of the transition may be displayed on the handset 134 while the PoC Client 136 is in the background, but the handset 134 may indicate the transition while PoC Client 136 is in foreground.

In another embodiment, when an in-call handover occurs between the wireless data network 126 and a WiFi network 142 (i.e., a PoC call session is in progress), specific actions may be taken to preserve the PoC call session, which may involve suspending the PoC call session while the in-call handover is taking place and then resuming the PoC call session when the in-call handover completes. The description of FIGS. 6 and 7 below refer to call flow diagrams to illustrate the messaging sequences for in-call transitions (i.e., wireless data network 126 to WiFi network 142, or WiFi network 142 to wireless data network 126).

When an in-call handover occurs between the wireless data network 126 and WiFi network 142 (i.e., a PoC call session is in progress), the handset 134 may or may not indicate the transition while PoC Client 136 is in foreground or background. In addition, control of the floor may or may not be revoked (locally, on the handset 134) and floor control may or may not be blocked during transition itself (e.g., for 6-12 seconds). Moreover, participation in the PoC call session may or may not be suspended for the handset 134 and PoC Client 136 in transition, while other (non-transitioning) participants in the PoC call may or may not continue with the session (for both private and group PoC calls). When the in-call handover between the wireless data network 126 and WiFi network 142 is completed, the suspended PoC Client 136 may automatically reconnect to the PoC call and continues the session.

In yet another embodiment, when an in-call handover occurs between the wireless data network 126 and WiFi network 142 (i.e., a PoC call session is in progress), the transition may or may not be transparent to the other (non-transitioning) participants of the PoC call. Specifically, the handsets 134 and PoC Clients 136 of the other (non-transitioning) participants of the PoC call session may receive a "Suspended" indication followed by a "Resumed" indication for the transitioning handset 134 and PoC Client 136 during the pendency of the transition. These indications may or may not be made both visual as well as audible to the other (non-transitioning) participants of the PoC call. In addition, control of the floor may or may not be revoked and floor control may or may not be blocked to the other (non-transitioning) participants of the PoC call session during the transition itself. The suspended PoC Clients 136 of the other (non-transitioning) participants of the PoC call session may automatically resume the PoC call session after the transitioning handset 134 and PoC Client 136 reconnect to the PoC call session when the in-call handover between the wireless data network 126 and WiFi network 142 is completed.

3.5 Call Flow Diagrams

FIGS. 2-7 are call flow diagrams illustrating the messaging sequences for initiating 1-1, Ad Hoc and Pre-Arranged PoC call sessions, as well as floor control, and in-call transitions (wireless data network 126 to WiFi network 142, or WiFi network 142 to wireless data network 126).

3.5.1 1-1 PoC Calls

Figure 2:
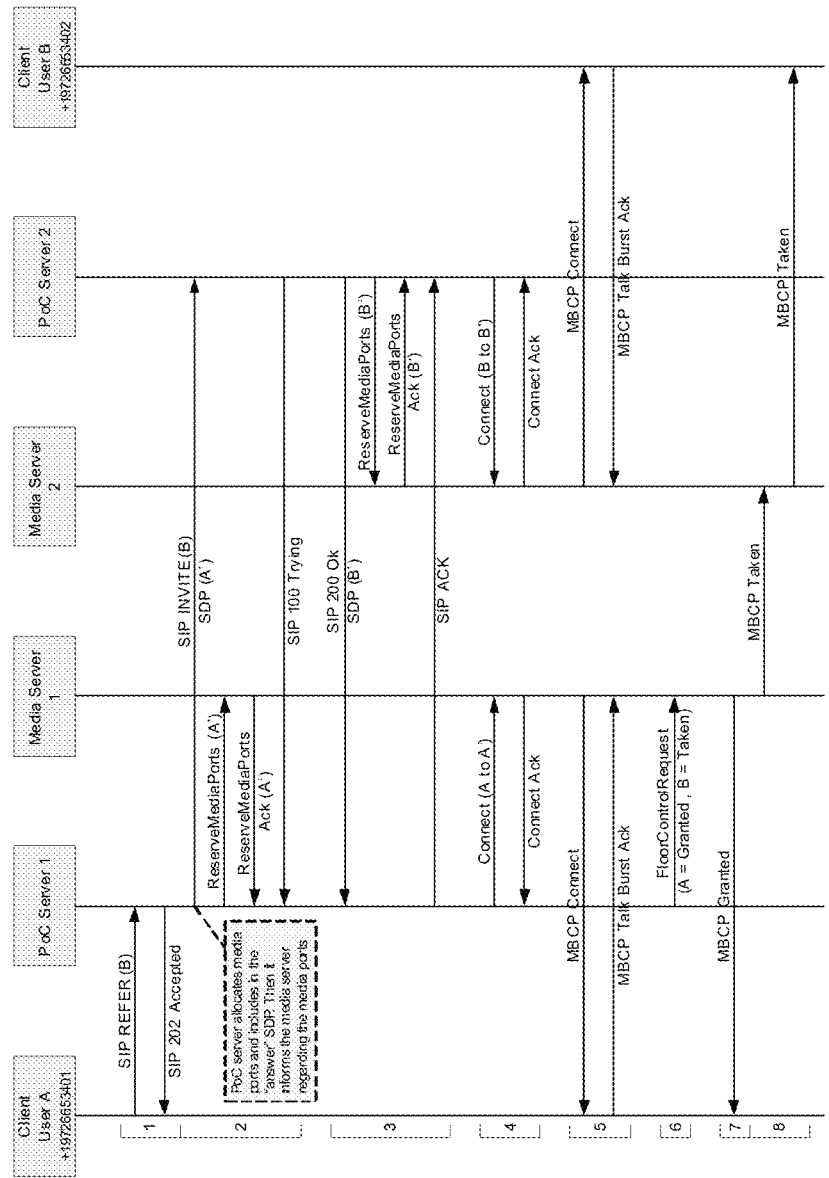
FIGS. 2-7 illustrate call flows for various scenarios according to the preferred embodiment of the present invention.

FIG. 2 shows the message flow for a 1-1 PoC call when the caller and called party are "homed" on different PoC Servers 112. Since the PoC Clients 136 use pre-established sessions for making and receiving PoC calls, the caller sends a SIP REFER request with the called party's URI. The caller's PoC Server 112 determines that the called party is homed on a different PoC Server 112 and initiates a SIP INVITE dialog to the other PoC Server 112. The PoC Servers 112 allocate separate media ports for the inter-PoC Server 112 call leg. The originating/controlling PoC Server 112 sends MBCP Connect messages to both calling and called parties. This is also valid on the called party's side since all PoC Clients 136 are set up in auto-answer mode. Then, the caller's PoC Server 112 (which assumes the role of the Controlling PoC Function), instructs its Media Server 114 to send appropriate floor control messages to the two parties.

The messages are described below:

1. The caller's PoC Client 136 initiates a 1-1 PoC call on the pre-established session dialog by sending a SIP REFER request to its PoC Server 112. Since the call is initiated on an existing SIP dialog, the PoC Client 136 specifies the called party's URI in the SIP Refer-To header. The PoC Server 112 checks whether the call origination is authorized and accepts the request.

2. The PoC Server 112 finds that the called party is homed on a different PoC Server 112 and initiates a SIP INVITE dialog with the remote PoC Server 112. The caller's home PoC Server 112 allocates a new set of media ports for this purpose and informs the Media Server 114 of the same. The remote PoC Server 112 acknowledges the request to stop SIP retransmissions.

3. The remote PoC Server 112 (i.e., the called party's home PoC Server 112) checks whether the called party is authorized to receive the call, finds that the PoC Client 136 is in auto-answer mode and accepts the call. It allocates a new set of media ports for this INVITE dialog and informs its Media Server 114 of the same. The caller's home PoC Server 112 receives the SIP "200 Ok" response and sends a SIP ACK request to complete the transaction.

4. Upon successful SIP dialog setup, the originating/controlling PoC Server 112 sends MBCP Connect messages to both calling and called parties, and to connect the media ports related to the pre-established session dialog to that of the inter-server SIP INVITE dialog.

5. The calling party's Media Server 114 sends a MBCP Connect message to the calling party's PoC Client 136. This indicates to the calling party that the called party has accepted the call. Similarly, the called party's Media Server 114 sends a MBCP Connect message to the called party. This message is the first indication to the called party regarding the incoming call and includes both caller and PoC session information.

Since the PoC Client 136 of the called party is setup in auto-answer mode, the call is already accepted.

6. For 1-1 PoC calls, the calling party's home PoC Server 112 assumes the Controlling PoC Function. After sending the MBCP Connect message to the calling party, the PoC Server 112 instructs the Media Server 114 to send appropriate floor control requests to the calling and called parties.

7. The Media Server 114 directly sends a MBCP Floor Granted message to the calling party, since the Media Server 114 is associated with the home PoC Server 112 of the caller, and this is where the media ports for the pre-established session dialog were set up. Note that this MBCP message may not be sent in the case where the caller had requested an implicit floor grant at the time of setting up the pre-established session.

8. The Media Server 114 sends a MBCP Floor Taken message to the called party through the called party's home Media Server 114. The MBCP messages between the two Media Servers 114 use the media ports allocated for the inter-server SIP INVITE dialog, while the MBCP messages are sent to the called party's PoC Client 136 using the media ports allocated for the pre-established session.

3.5.2 Ad Hoc PoC Calls

Figure 3:
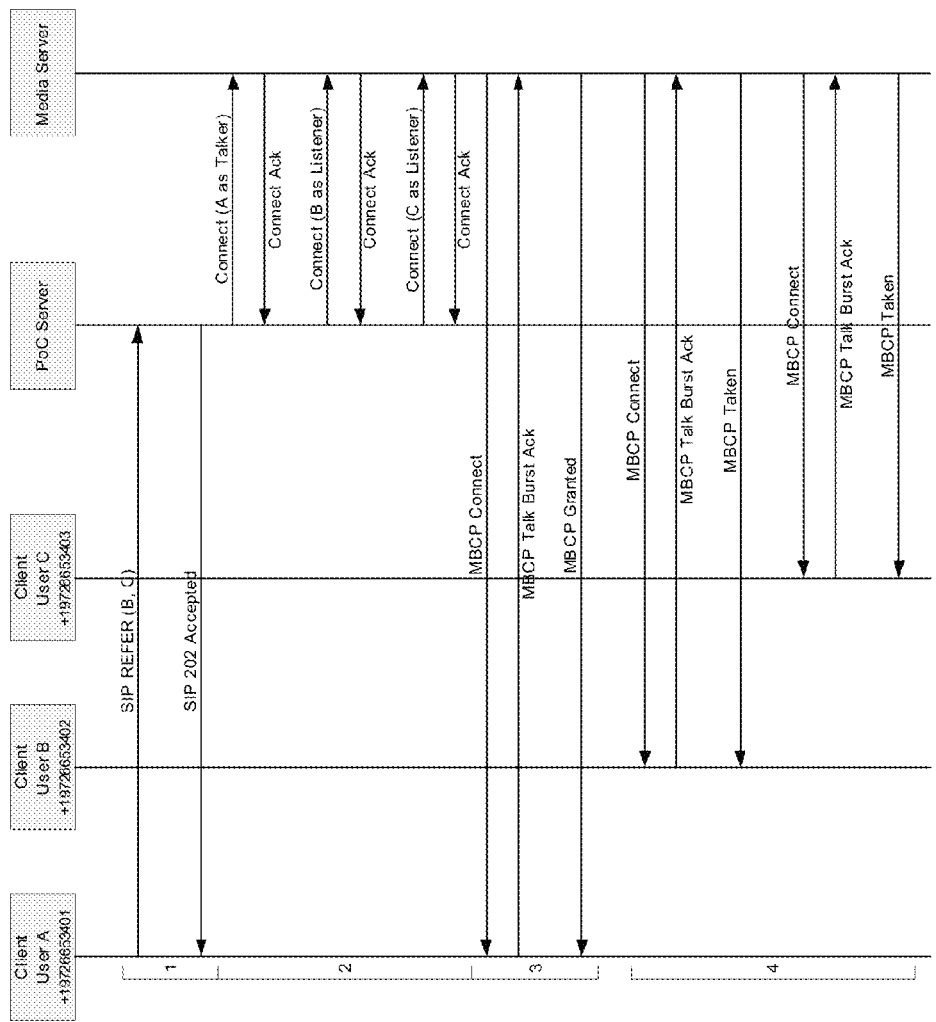

FIG. 3 shows the message flow for an Ad Hoc PoC call where all the participants are homed on the same PoC Server 112. Similar to the 1-1 PoC call described above, the PoC Client 136 uses the pre-established session dialog to initiate the call by sending a SIP REFER request, wherein the called parties are listed in the message body. The PoC Server 112 authorizes the call attempt (both originating and terminating parties) and sends a MBCP Connect message to each participant to join them in the call. The PoC Server 112 then sends appropriate floor control messages to the participants to initially grant the floor to the caller and subsequently to manage the floor as required.

The messages are described below:

1. The PoC Client 136 initiates an Ad Hoc PoC call using the pre-established session by sending a SIP REFER request. The list of called parties is included in the message body of the SIP REFER request.

2. Since the calling and called parties are homed on the same PoC Server 112 and all of them use pre-established sessions in auto-answer mode, the PoC Server 112 authorizes the call origination and termination attempts and instructs the Media Server 114 to send MBCP Connect messages to the PoC Clients 136. It also specifies which party should be connected in which mode, e.g., whether as talker (calling party) or listener (called parties).

3. The Media Server 114 sends a MBCP Connect message to the calling party, followed by a MBCP Floor Granted message. The MBCP Floor Granted message is optional depending on whether the calling party had requested for implicit floor grant at the time of setting up the pre-established session.

4. The Media Server 114 then sends MBCP Connect and MBCP Floor Taken messages to the called parties. The first indication of an incoming call for the called parties is when they receive the MBCP Connect message with both caller and PoC session details. Since the PoC Clients 136 are set up in auto-answer mode, the calls are already accepted, and the PoC Clients 136 start receiving voice RTP packets when the caller starts speaking (RTP packets not shown in the message flow).

3.5.3 Pre-Arranged PoC Calls

Figure 4:
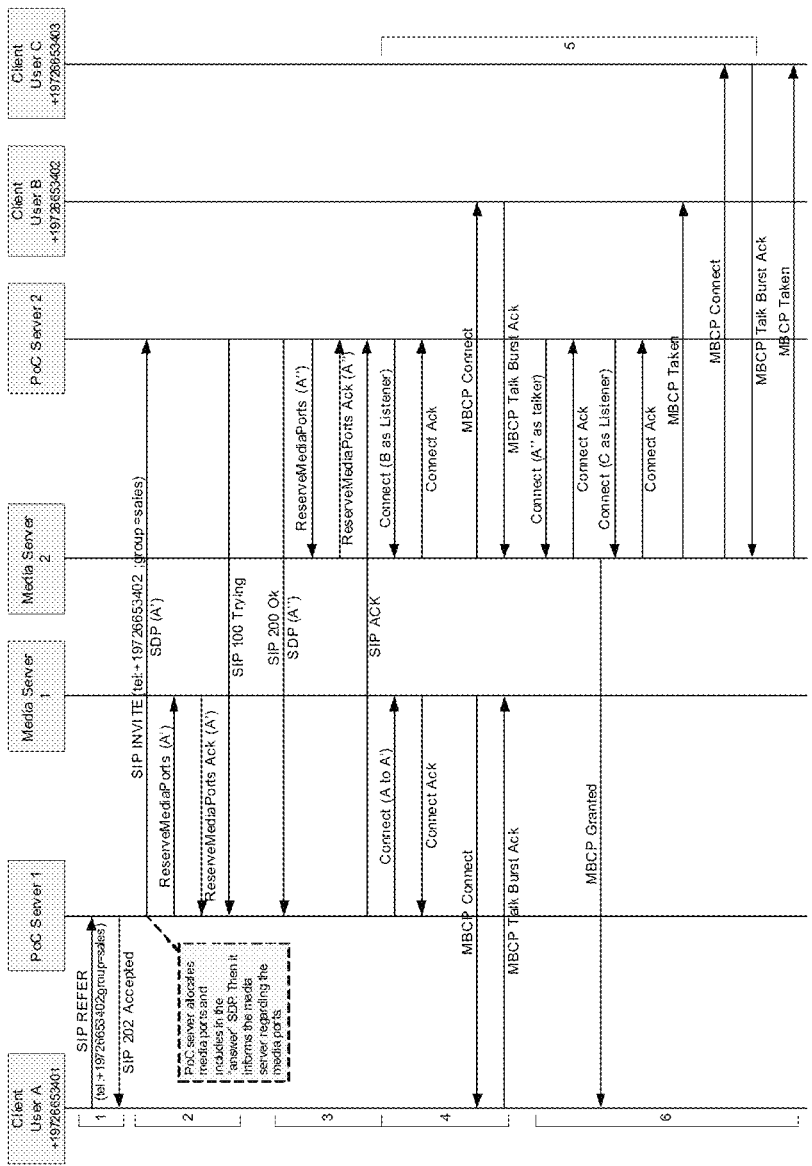

FIG. 4 shows the message flow for a Pre-Arranged PoC call where the caller is homed on a different PoC Server 112 than the other members of the group. Since the group is owned by another member of the group, the group itself is also homed on a different PoC Server 112 than the caller, e.g., the Pre-Arranged PoC groups may always be homed on the same PoC Server 112 as the owner of the group. The PoC Client 136 uses the pre-established session dialog to initiate the call by sending a SIP REFER request. Since this is a Pre-Arranged PoC call, the caller specifies the group URI in the SIP REFER request instead of the individual members. The caller's PoC Server 112 authorizes the originating call attempt and finds that the group is homed on a different PoC Server 112. It initiates a SIP INVITE dialog with the group home PoC Server 112 after allocating the media ports for this leg. In this case, the caller's PoC Server 112 sends a MBCP Connect message to the caller after the SIP INVITE transaction is completed. The group home PoC Server 112 sends MBCP Connect messages to the other participants since they are homed on this PoC Server 112. The group home PoC Server 112 assumes the role of the Controlling PoC Function and sends appropriate floor control messages to the participants to initially grant the floor to the caller and subsequently to manage the floor as required.

The messages are described below:

1. The PoC Client 136 initiates a Pre-Arranged PoC call using the pre-established session by sending a SIP REFER request that specifies the PoC group URI in the SIP Refer-To header. The SIP REFER request is sent to the caller's home PoC Server 112, and the PoC Server 112 checks whether the caller is authorized to make this PoC call and then accepts the request.

2. The PoC Server 112 finds that the PoC group is homed on a different PoC Server 112 (the group owner's home PoC Server 112). It then allocates a new set of media ports and creates and sends a SIP INVITE request to the remote PoC Server 112 with the request URI set to the PoC group URI. The PoC Server 112 then informs the Media Server 114 of these media ports. The remote PoC Server 112 acknowledges the SIP INVITE request to stop retransmissions.

3. The remote PoC Server 112 (group home PoC Server 112) checks the validity of the group URI and checks whether the caller is allowed to initiate the call, as well as whether at least one member is able to receive the call. Then, it allocates a new set of media ports for the inter-server SIP INVITE dialog and sends a SIP "200 Ok" response to the caller's home PoC Server 112. The caller's home PoC Server 112 sends a SIP ACK request to complete the SIP transaction.

4. When the inter-server SIP INVITE dialog is successfully set up, the caller's home PoC Server 112 connects the caller-side inter-server media ports to the caller's pre-established session media ports.

5. At the same time, the group home PoC Server 112 instructs the Media Server 114 to connect the calling party and each of the called parties and join them into the conference, along with the group-home-side inter-server media ports. The Media Server 114 sends MBCP Connect messages to the calling party and each of the called parties and includes both caller and PoC session details. This message also includes the PoC group URI to provide additional context for the call. Since the PoC Clients 136 are set up in auto-answer mode, the MBCP Connect message will be the first indication of the incoming call for called parties. The call itself is already accepted and the PoC Client 136 will start receiving the voice RTP packets when the caller starts speaking.

6. The group home PoC Server 112 assumes the role of Controlling PoC Function as described above and controls the floor by sending a MBCP Floor Granted message to the caller and MBCP Taken messages to each of the called parties.

3.5.4 Floor Control

MBCP messages are used by the PoC Client 136 and PoC Server 112 to exchange floor control messages within a PoC session. A MBCP Connect message is used for terminating an incoming PoC session to an invited party when the invited party has auto-answer enabled. This is also used for connecting the calling party to the call when at least one of the called parties accepts or auto-answers the call. Similarly, a MBCP Disconnect message is used for disconnecting the calling and called parties.

Figure 5:
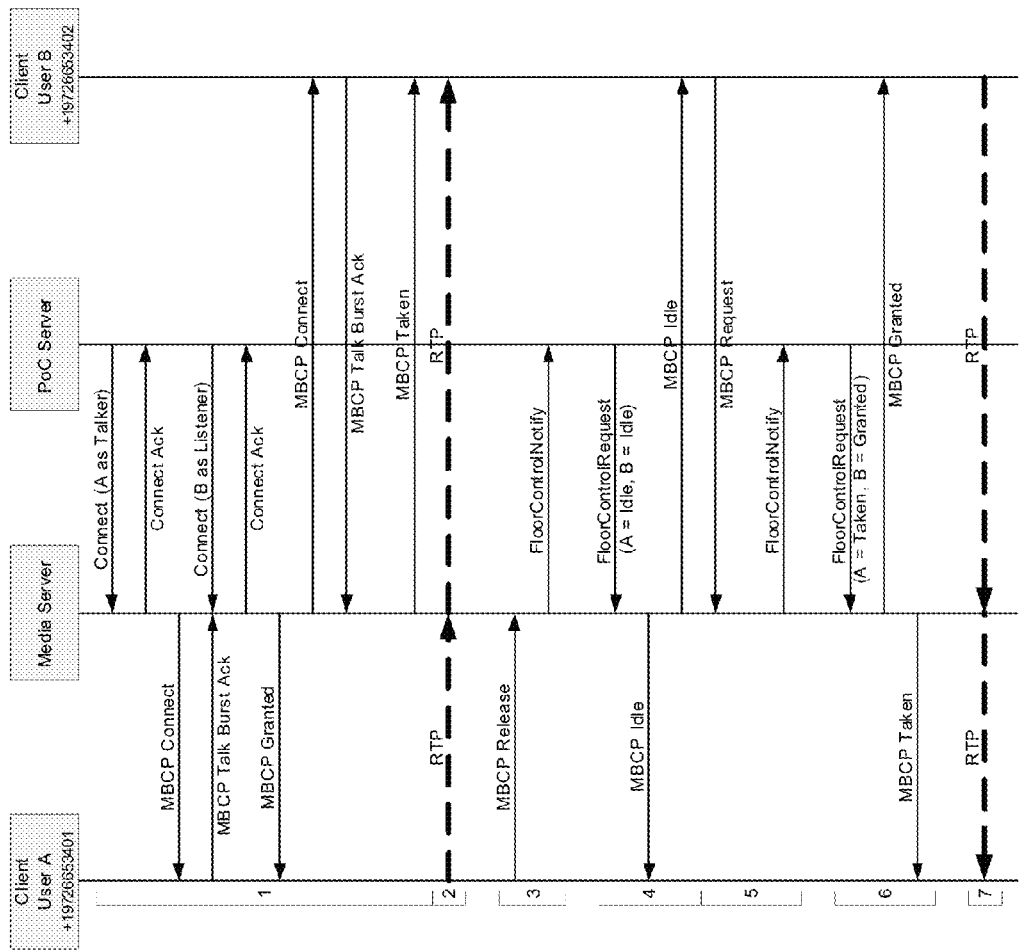

FIG. 5 shows floor exchange scenario for a 1-1 PoC call where both the participants are homed on the same PoC Server 112. This message flow can be easily applied for other types of PoC calls including those scenarios that involve multiple PoC Servers 112, with appropriate modifications similar to that shown in the PoC call message flows described in the previous sections.

In this message flow, the first few messages show the MBCP Connect and associated intra-server messages that are used for joining the participants in the call, as well as the initial floor assignment. The direction of the RTP packets show whose voice packets get replicated to the other participants. The rest of the message flow show a floor release request from the current talker, a floor idle indication to all the participants, and subsequent floor request and grant for another participant in the call.

The messages are described below:

1. This set of messages is for a 1-1 PoC call to between subscribers A and B using a pre-established session (SIP signaling messages are not shown in the figure). The two parties are connected into the PoC session using MBCP Connect messages and an initial set of floor control messages are sent to the PoC Clients 136 as described in the 1-1 PoC session initiation scenario described above.

2. Since the floor is initially granted to the calling party, the voice RTP packets from subscriber A are sent to subscriber B by the Media Server 114. Although the individual call legs are established in full-duplex mode, the voice RTP packets originating from the listeners are dropped by the Media Server 114 to emulate half-duplex mode.

3. Subscriber A releases the floor after some time. The PoC Client 136 sends a MBCP Release message to the Media Server 114, which sends the indication to the PoC Server 112.

4. The PoC Server 112 instructs the Media Server 114 to set the floor as idle and notify all parties in the call by sending a MBCP Idle message to the PoC Clients 136.

5. Subscriber B requests for floor by sending a MBCP Request message to the Media Server 114. The Media Server 114 forwards the request to the PoC Server 112.

6. The PoC Server 112 grants the floor to subscriber B and instructs the Media Server 114 to send appropriate MBCP messages to all parties in the call. The Media Server 114 sends a MBCP Granted message to subscriber B's PoC Client 136 and a MBCP Taken message to subscriber A's PoC Client 136.

7. Based on the current floor owner, the Media Server 114 starts forwarding voice RTP packets from subscriber B to subscriber A, while dropping all RTP packets from subscriber A.

3.5.5 In-Call Transition (Wireless Data Network to WiFi Network)

Figure 6:
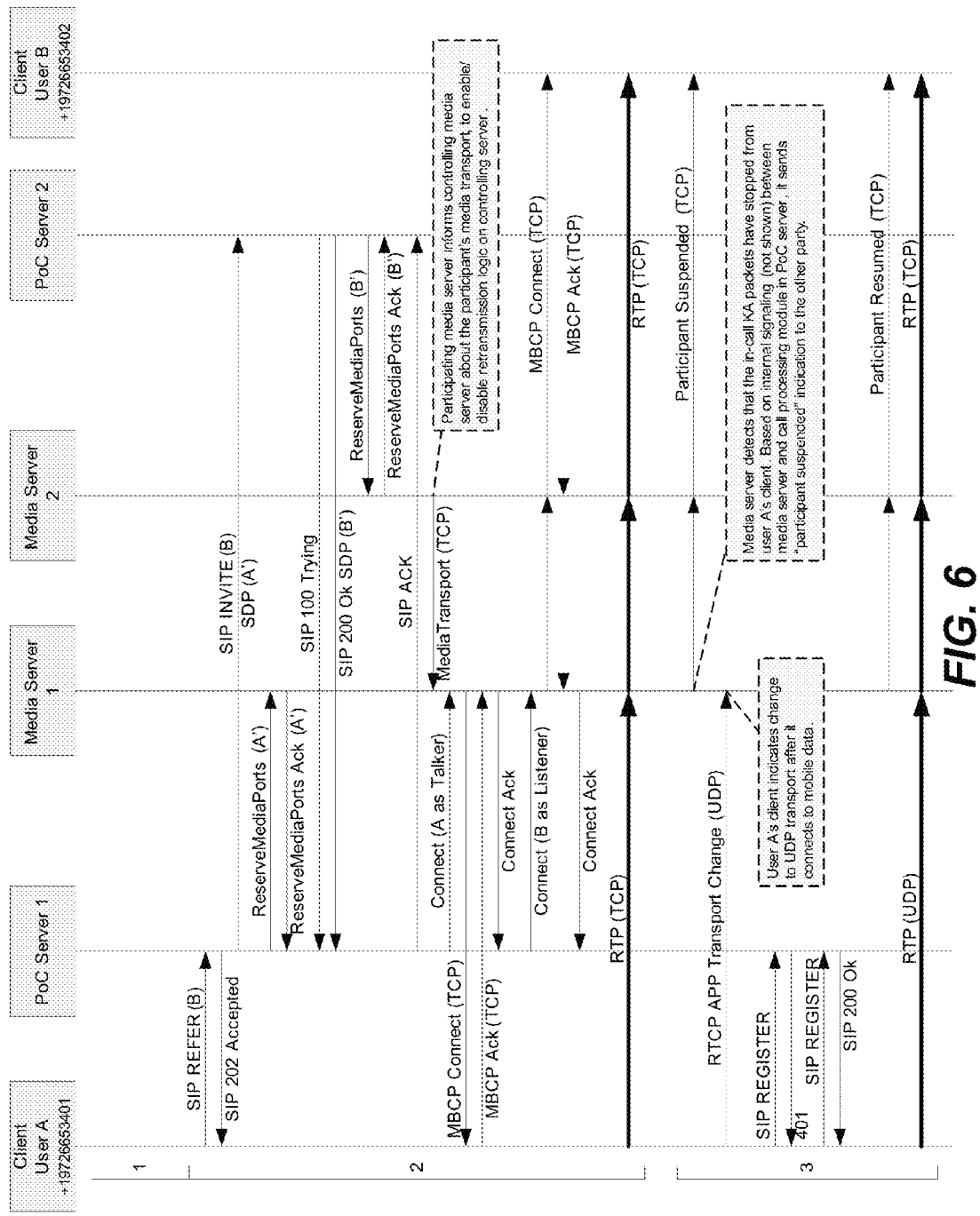

FIG. 6 shows the message flow for a 1-1 PoC call when the caller and called party are "homed" on different PoC Servers 112, when an in-call transition occurs from the wireless data network 126 to the WiFi network 142. Since the PoC Clients 136 use pre-established sessions for making and receiving PoC calls, the caller sends a SIP REFER request with the called party's URI. The caller's PoC Server 112 determines that the called party is homed on a different PoC Server 112 and initiates a SIP INVITE dialog to the other PoC Server 112. The PoC Servers 112 allocate separate media ports for the inter-PoC Server 112 call leg. The originating/controlling PoC Server 112 sends MBCP Connect messages to both calling and called parties. This is also valid on the called party's side since all PoC Clients 136 are set up in auto-answer mode. Then, the caller's PoC Server 112 (which assumes the role of the Controlling PoC Function), instructs its Media Server 114 to send appropriate messages to the two parties.

The messages are described below:

1. The user at handset 134 "A" launches the PoC Client 136 and browses through the contact list to make a PoC call. The handset 134 is currently connected to wireless data network 126.

2. The caller's PoC Client 136 initiates a 1-1 PoC call on a pre-established session dialog by sending a SIP REFER request to its PoC Server 112. Since the call is initiated on an existing SIP dialog, the PoC Client 136 specifies the called party's URI in the SIP Refer-To header. The PoC Server 112 checks whether the call origination is authorized and accepts the request.

The PoC Server 112 finds that the called party is homed on a different PoC Server 112 and initiates a SIP INVITE dialog with the remote PoC Server 112. The caller's home PoC Server 112 allocates a new set of media ports for this purpose and informs the Media Server 114 of the same. The remote PoC Server 112 acknowledges the request to stop SIP retransmissions.

The remote PoC Server 112 (i.e., the called party's home PoC Server 112) checks whether the called party is authorized to receive the call, finds that the PoC Client 136 is in auto-answer mode and accepts the call. It allocates a new set of media ports for this INVITE dialog and informs its Media Server 114 of the same. The caller's home PoC Server 112 receives the SIP "200 Ok" response and sends a SIP ACK request to complete the transaction.

Upon successful SIP dialog setup, the originating/controlling PoC Server 112 sends MBCP Connect messages to both calling and called parties, and to connect the media ports related to the pre-established session dialog to that of the inter-server SIP INVITE dialog.

The calling party's Media Server 114 sends a MBCP Connect message to the calling party's PoC Client 136. This indicates to the calling party that the called party has accepted the call. Similarly, the called party's Media Server 114 sends a MBCP Connect message to the called party. This message is the first indication to the called party regarding the incoming call and includes both caller and PoC session information. Since the PoC Client 136 of the called party is setup in auto-answer mode, the call is already accepted.

For 1-1 PoC calls, the calling party's home PoC Server 112 assumes the Controlling PoC Function. After sending the MBCP Connect message to the calling party, the PoC Server 112 instructs the Media Server 114 to send appropriate floor control requests to the calling and called parties. Since the floor is initially granted to the calling party, the voice RTP packets from subscriber A are sent to subscriber B by the Media Server 114.

3. The handset 134 for user A moves into the coverage area of a known WiFi network 142 (known by its Service Set Identifier or SSID). This may cause the handset 134 to automatically connect to the WiFi network 142, or the user may manually cause the handset 134 to connect to the WiFi network 142, thereby initiating a transition from the wireless data network 126 to the WiFi network 142. During this transition, RTP packets are not received by the Media Server 114 from the transitioning PoC Client 136. This is detected by the Media Server 114 and it sends a "Suspended" indication to the other (non-transitioning) participants, as instructed by PoC Server 112. When the handset 134 for user A completes its transition and is connected to the WiFi network 142, it communicates via the RV Server 140. The PoC Client 136 resumes PoC service by first sending an RTCP APP transport change (UDP) indication to the Media Server 114 to inform the Media Server 114 that it will use TCP transport for all further floor changes. The PoC Client 136 then sends a first SIP REGISTER to its PoC Server 112, which is acknowledged, followed by a second SIP REGISTER to its PoC Server 112, which is also acknowledged, to update its contact IP address, by first dropping the previous IP address on the wireless data network 126 and then adding the new IP address on the WiFi network 142. Based on these messages, the Media Server 114 sends a "Resumed" indication to the other (non-transitioning) participants. Thereafter, the Media Server 114 sends appropriate floor control requests to the calling and called parties, and assuming that floor control is granted to the calling party (although it could be granted to one of the called parties), the voice RTP packets from subscriber A are sent to subscriber B by the Media Server 114.

3.5.6 In-Call Transition (WiFi Network to Wireless Data Network)

Figure 7:
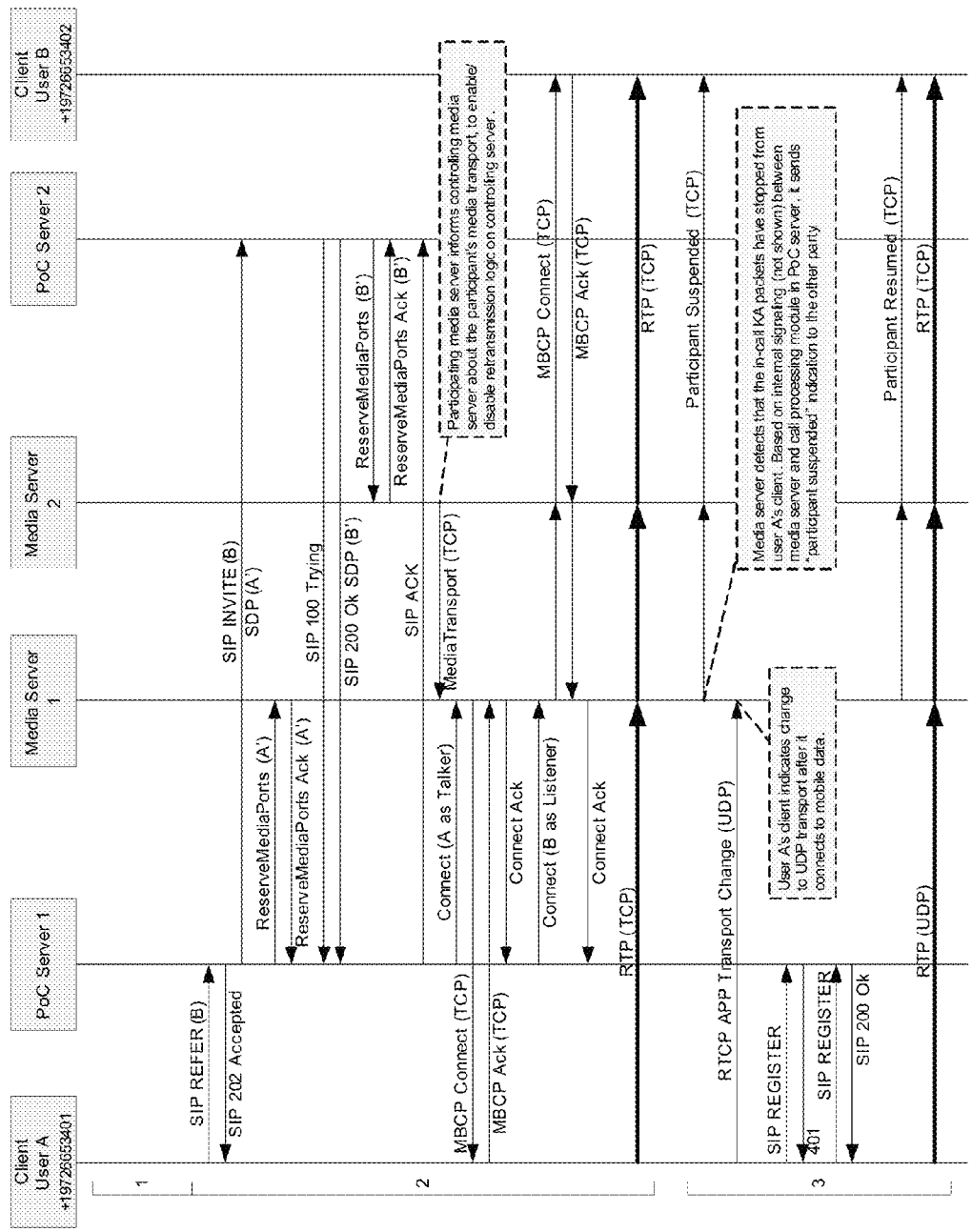

FIG. 7 shows the message flow for a 1-1 PoC call when the caller and called party are "homed" on different PoC Servers 112, when an in-call transition occurs from the WiFi network 142 to the wireless data network 126. Since the PoC Clients 136 use pre-established sessions for making and receiving PoC calls, the caller sends a SIP REFER request with the called party's URI. The caller's PoC Server 112 determines that the called party is homed on a different PoC Server 112 and initiates a SIP INVITE dialog to the other PoC Server 112. The PoC Servers 112 allocate separate media ports for the inter-PoC Server 112 call leg. The originating/controlling PoC Server 112 sends MBCP Connect messages to both calling and called parties. This is also valid on the called party's side since all PoC Clients 136 are set up in auto-answer mode. Then, the caller's PoC Server 112 (which assumes the role of the Controlling PoC Function), instructs its Media Server 114 to send appropriate messages to the two parties.

The messages are described below:

1. The user at handset 134 "A" launches the PoC Client 136 and browses through the contact list to make a PoC call. The handset 134 is currently connected to WiFi network 142.

2. The caller's PoC Client 136 initiates a 1-1 PoC call on a pre-established session dialog by sending a SIP REFER request to its PoC Server 112. Since the call is initiated on an existing SIP dialog, the PoC Client 136 specifies the called party's URI in the SIP Refer-To header. The PoC Server 112 checks whether the call origination is authorized and accepts the request.

The PoC Server 112 finds that the called party is homed on a different PoC Server 112 and initiates a SIP INVITE dialog with the remote PoC Server 112. The caller's home PoC Server 112 allocates a new set of media ports for this purpose and informs the Media Server 114 of the same. The remote PoC Server 112 acknowledges the request to stop SIP retransmissions.

The remote PoC Server 112 (i.e., the called party's home PoC Server 112) checks whether the called party is authorized to receive the call, finds that the PoC Client 136 is in auto-answer mode and accepts the call. It allocates a new set of media ports for this INVITE dialog and informs its Media Server 114 of the same. The caller's home PoC Server 112 receives the SIP "200 Ok" response and sends a SIP ACK request to complete the transaction.

Upon successful SIP dialog setup, the originating/controlling PoC Server 112 sends MBCP Connect messages to both calling and called parties, and to connect the media ports related to the pre-established session dialog to that of the inter-server SIP INVITE dialog.

The calling party's Media Server 114 sends a MBCP Connect message to the calling party's PoC Client 136. This indicates to the calling party that the called party has accepted the call. Similarly, the called party's Media Server 114 sends a MBCP Connect message to the called party. This message is the first indication to the called party regarding the incoming call and includes both caller and PoC session information. Since the PoC Client 136 of the called party is setup in auto-answer mode, the call is already accepted.

For 1-1 PoC calls, the calling party's home PoC Server 112 assumes the Controlling PoC Function. After sending the MBCP Connect message to the calling party, the PoC Server 112 instructs the Media Server 114 to send appropriate floor control requests to the calling and called parties. Since the floor is initially granted to the calling party, the voice RTP packets from subscriber A are sent to subscriber B by the Media Server 114.

3. The handset 134 for user A moves into the coverage area of the wireless data network 126. This may cause the handset 134 to automatically connect to the wireless data network 126, or the user may manually cause the handset 134 to connect to the wireless data network 126, thereby initiating a transition from the WiFi network 142 to wireless data network 126. During this transition, RTP packets are not received by the Media Server 114 from the transitioning PoC Client 136. This is detected by the Media Server 114 and it sends a "Suspended" indication to the other (non-transitioning) participants, as instructed by PoC Server 112. When the handset 134 for user A completes its transition and is connected to the wireless data network 1264, the PoC Client 136 resumes PoC service by first sending an RTCP APP transport change (UDP) indication to the Media Server 114 to inform the Media Server 114 that it will use UDP transport for all further floor changes. The PoC Client 136 then sends a first SIP REGISTER to its PoC Server 112, which is acknowledged, followed by a second SIP REGISTER to its PoC Server 112, which is also acknowledged, to update its contact IP address, by first dropping the previous IP address on the WiFi network 142 and then adding the new IP address on the wireless data network 126. Based on these messages, the Media Server 114 sends a "Resumed" indication to the other (non-transitioning) participants. Thereafter, the Media Server 114 sends appropriate floor control requests to the calling and called parties, and assuming that floor control is granted to the calling party (although it could be granted to one of the called parties), the voice RTP packets from subscriber A are sent to subscriber B by the Media Server 114.

3.5.7 No in-Call Transition (Defer Handover Until the Call Finishes)

In another embodiment, the handover may be deferred until the in-progress PoC call session is completed. In other words, the PoC Client 136 is configured such that no handover occurs during a PoC call. Instead, a handover would only occur once the PoC call is completed, and the handover would be performed in Idle mode, as described above.

Conclusion

The foregoing description of the preferred embodiment of the invention has been presented for the purposes of illustra-

What is claimed is:

1. A system for providing advanced voice services in a plurality of wireless communications networks, comprising:
one or more servers that interface to the wireless communications networks to perform advanced voice services, the advanced voice services being performed for one or more mobile units in the wireless communications networks and the advanced voice services including an instant two-way half-duplex voice call within a group of mobile units comprising a Push-to-Talk-over-Cellular (PoC) call session;
wherein both servers and the mobile units that use the advanced group services communicate with each other using Internet Protocol (IP) control messages within the wireless communications networks, and at least one of the servers switches IP voice packets for the advanced group services between the mobile units across the wireless communications networks;
wherein at least one of the servers manages the PoC call session by acting as an arbitrator for the PoC call session and controls sending of the IP control packets and the IP voice packets to and from the mobile units;
wherein at least one of the servers relays the IP voice packets between the mobile units and the servers;
wherein at least one of the wireless communications networks comprises a WiFi network and at least one of the wireless communications networks comprises a wireless data network operated by a cellular service provider; and
wherein at least one of the servers is coupled to the WiFi network, and the mobile units together with the servers coupled to the WiFi network implement a WiFi interworking solution for performing transitions of the mobile units between the WiFi network and the wireless data network operated by the cellular service provider.

2. The system of claim 1, wherein the mobile units use secure transport protocols across the WiFi network, and the secure transport protocols provide end-to-end encryption for all traffic transmitted to and from the mobile units.

3. The system of claim 1, wherein connections between the mobile units and the servers coupled to the WiFi network are persisted.

4. The system of claim 1, wherein connections between the mobile units and the servers coupled to the WiFi network traverse one or more firewalls, and the firewalls are default configured to allow and not deny the connections between the mobile units and the servers to the WiFi network.

5. The system of claim 1, wherein an idle handover of the mobile units between the WiFi network and the wireless data network operated by the cellular service provider is transparent to users.

6. The system of claim 1, wherein an in-call handover of the mobile units between the WiFi network and the wireless data network operated by the cellular service provider results in specific actions being taken to preserve the PoC call session, which involve suspending the PoC call session while the in-call handover is taking place, and then resuming the PoC call session when the in-call handover completes.

7. The system of claim 1, wherein a handover of the mobile units between the WiFi network and the wireless data network operated by the cellular service provider is deferred while the PoC call session is in-progress, such that no handover occurs during the PoC call session.

8. The system of claim 1, wherein the servers coupled to the WiFi network aggregate or dis-aggregate traffic from the mobile units to other servers, depending on message types and availability of the other servers.

9. A method of providing advanced voice services in a plurality of wireless communications networks, comprising:
performing advanced voice services in one or more servers that interface to the wireless communications networks, the advanced voice services being performed for one or more mobile units in the wireless communications networks and the advanced voice services including an instant two-way half-duplex voice call within a group of mobile units comprising a Push-to-Talk-over-Cellular (PoC) call session;
wherein both servers and the mobile units that use the advanced group services communicate with each other using Internet Protocol (IP) control messages within the wireless communications networks, and at least one of the servers switches IP voice packets for the advanced group services between the mobile units across the wireless communications networks;
wherein at least one of the servers manages the PoC call session by acting as an arbitrator for the PoC call session and controls sending of the IP control packets and the IP voice packets to and from the mobile units;
wherein at least one of the servers relays the IP voice packets between the mobile units and the servers;
wherein at least one of the wireless communications networks comprises a WiFi network and at least one of the wireless communications networks comprises a wireless data network operated by a cellular service provider; and
wherein at least one of the servers is coupled to the WiFi network, and the mobile units together with the servers coupled to the WiFi network implement a WiFi interworking solution for performing transitions of the mobile units between the WiFi network and the wireless data network operated by the cellular service provider.

10. The method of claim 9, wherein the mobile units use secure transport protocols across the WiFi network, and the secure transport protocols provide end-to-end encryption for all traffic transmitted to and from the mobile units.

11. The method of claim 9, wherein connections between the mobile units and the servers coupled to the WiFi network are persisted.

12. The method of claim 9, wherein connections between the mobile units and the servers coupled to the WiFi network traverse one or more firewalls, and the firewalls are default configured to allow and not deny the connections between the mobile units and the servers to the WiFi network.

13. The method of claim 9, wherein an idle handover of the mobile units between the WiFi network and the wireless data network operated by the cellular service provider is transparent to users.

14. The method of claim 9, wherein an in-call handover of the mobile units between the WiFi network and the wireless data network operated by the cellular service provider results in specific actions being taken to preserve the PoC call session, which involve suspending the PoC call session while the in-call handover is taking place, and then resuming the PoC call session when the in-call handover completes.

15. The method of claim 9, wherein a handover of the mobile units between the WiFi network and the wireless data network operated by the cellular service provider is deferred while the PoC call session is in-progress, such that no handover occurs during the PoC call session.

16. The method of claim 9, wherein the servers coupled to the WiFi network aggregate or dis-aggregate traffic from the mobile units to other servers, depending on message types and availability of the other servers.

* * * * *